(12) United States Patent
Grace

(10) Patent No.: US 7,543,270 B1
(45) Date of Patent: Jun. 2, 2009

(54) TRACING OUTPUT DESCRIPTIONS GENERATED FROM CORRESPONDING INPUT DESCRIPTIONS

(75) Inventor: Andrew Grace, Sherborn, MA (US)

(73) Assignee: The Math Works, Inc., Natick, MA (US)

(*) Notice: Subject to any disclaimer, the term of this patent is extended or adjusted under 35 U.S.C. 154(b) by 762 days.

(21) Appl. No.: 10/763,487

(22) Filed: Jan. 23, 2004

(51) Int. Cl.
*G06F 9/44* (2006.01)
(52) U.S. Cl. .................. 717/110; 717/137; 715/203
(58) Field of Classification Search ......... 717/136–137, 717/110–113, 106; 714/2–3; 715/203
See application file for complete search history.

(56) References Cited

U.S. PATENT DOCUMENTS

| | | | | |
|---|---|---|---|---|
| 5,507,030 A * | 4/1996 | Sites | ........................... | 717/136 |
| 5,541,837 A * | 7/1996 | Fushimoto | ..................... | 704/2 |
| 5,652,899 A * | 7/1997 | Mays et al. | .................. | 715/512 |
| 5,797,011 A * | 8/1998 | Kroll et al. | .................. | 717/137 |
| 6,083,278 A * | 7/2000 | Olson et al. | .................. | 717/113 |
| 6,119,078 A * | 9/2000 | Kobayakawa et al. | .......... | 704/3 |
| 6,330,529 B1 * | 12/2001 | Ito | ................................ | 704/3 |
| 6,594,823 B1 * | 7/2003 | Corbin et al. | ............... | 717/143 |
| 6,718,371 B1 * | 4/2004 | Lowry et al. | ................ | 709/213 |
| 6,829,759 B1 * | 12/2004 | Davis et al. | .................. | 717/140 |
| 6,986,101 B2 * | 1/2006 | Cooper et al. | ............... | 715/513 |
| 7,017,146 B2 * | 3/2006 | Dellarocas et al. | .......... | 717/106 |
| 7,178,103 B2 * | 2/2007 | Humphrey et al. | .......... | 715/513 |
| 7,231,600 B2 * | 6/2007 | Zhou et al. | .................. | 715/536 |
| 2001/0047255 A1 * | 11/2001 | Fuji | ........................... | 704/10 |
| 2002/0123879 A1 * | 9/2002 | Spector | ........................ | 704/2 |
| 2003/0069908 A1 * | 4/2003 | Anthony et al. | ............. | 707/513 |
| 2003/0121000 A1 * | 6/2003 | Cooper et al. | ............... | 715/513 |
| 2004/0177343 A1 * | 9/2004 | McVoy et al. | ............... | 717/122 |
| 2004/0194020 A1 * | 9/2004 | Beda et al. | .................. | 715/502 |
| 2005/0010421 A1 * | 1/2005 | Watanabe et al. | ........... | 704/277 |

OTHER PUBLICATIONS

McArthur Mylopoulos Ng "An Extensible Tool for Source Code Representation Using XML" 2002, IEEE WCRE'02.*
Zou, Ying, Kontogiannis, Kostas, "Towards Portable XML-Based Source Code Representation", 2001, International Conference on Software Engineering (ICSE) Workshops of XML Technologies and Software Engineering (XSE).*
Mamas, Kontogiannis "Towards Portable Source Code Representations Using XML" 2000, IEEE WCRE'00.*

* cited by examiner

*Primary Examiner*—Lewis A Bullock, Jr.
*Assistant Examiner*—Jason Mitchell
(74) *Attorney, Agent, or Firm*—Lahive & Cockfield, LLP; Kevin J. Canning

(57) ABSTRACT

Methods and systems in which output descriptions are generated in response to input descriptions are disclosed. The input descriptions and output descriptions are displayed together so that the users can visually compare the input descriptions and corresponding output descriptions. Users are able to trace output descriptions generated from corresponding input descriptions and to trace input descriptions from which corresponding output descriptions are generated. For example, if one of the input descriptions and output descriptions is scrolled, the other descriptions may be automatically scrolled. In addition, if a cursor is provided in one of the input descriptions and output descriptions, another cursor may be automatically provided in the other descriptions. Furthermore, if a segment is selected in one of the input descriptions and output descriptions, a corresponding segment is automatically selected in the other descriptions.

35 Claims, 10 Drawing Sheets

TRACING OUTPUT DESCRIPTIONS GENERATED FROM CORRESPONDING INPUT DESCRIPTIONS

FIELD OF THE INVENTION

The present invention relates generally to code generation tools and more particularly to methods and systems for tracing output descriptions generated from corresponding input descriptions and for tracing input descriptions from which corresponding output descriptions are generated in the code generation tools.

BACKGROUND OF THE INVENTION

Code generation technologies for receiving input code written in a programming language and producing output code written in another programming language are widely used in hardware and software development industries. Such code generation technologies are prevalent, in particular, in the field of developing embedded systems. Embedded systems form a component of some larger systems and are expected to function without human intervention. Embedded systems are various types of computer systems or computing devices that perform dedicated functions and/or are designed for use with a specific embedded software application. In the development of the embedded systems, code generators are used to translate input code to corresponding output code. In the code generation process, it is desirable for the programmers to trace output code that is generated from corresponding input code and to trace input code from which corresponding output code is generated.

SUMMARY OF THE INVENTION

The present invention provides methods and systems in which output descriptions are generated in response to input descriptions. The present invention displays the input descriptions and output descriptions together so that users can visually compare the input descriptions and corresponding output descriptions. The present invention enables the users to trace output descriptions generated from corresponding input descriptions. The present invention also enables the users to trace input descriptions from which corresponding output descriptions are generated. For example, if one of the input descriptions and output descriptions is scrolled, the other descriptions may be automatically scrolled, which enables the users to trace the input descriptions and output descriptions by scrolling only one of the input descriptions and output descriptions. In addition, if a cursor is provided in one of the input descriptions and output descriptions, another cursor may be automatically provided in the other descriptions. Furthermore, if a segment is selected in one of the input descriptions and output descriptions, a corresponding segment is automatically selected in the other descriptions.

In accordance with one aspect of the present invention, a method is provided for tracing an output description generated from a corresponding input description. The output description is generated in response to the input description. The input description and the output description are displayed together on a display. In response to scrolling one of the input description and the output description, the other description is automatically scrolled in proportion to the scrolled amount in the one of the input description and the output description.

In another aspect of the present invention, a method is provided for tracing an output description generated from a corresponding input description. The output description is generated in response to the input description. The input description and the output description are displayed together on a display. In response to displaying a cursor in one of the input description and the output description, another cursor is automatically displayed in the other description.

In still another aspect of the present invention, a method is provided for tracing an output description generated from a corresponding input description. The output description is generated in response to the input description. The input description and the output description are displayed together on a display. In response to selecting a segment in one of the input descriptions and the output descriptions, a corresponding segment is automatically selected in the other description.

By providing code generation tools that display input descriptions and output descriptions together, the present invention enables users to easily trace output descriptions generated from corresponding input descriptions and to trace input descriptions from which corresponding output descriptions are generated.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention concerns code generation tools that receive input code and generate corresponding output code. The illustrative embodiment of the present invention enables users to trace output code generated from corresponding input code, and to trace input code from which corresponding output code is generated. The input code and corresponding output code are cross-referenced to each other and displayed side by side on a display so that the users can visually compare the input code and output code. In the illustrative embodiment of the present invention, cross references are included in the lines of the input and output code. One of skill in the art will appreciate that the cross references may be included in the beginning of the input and output code. One of skill in the art will also appreciate that different schemes of cross referencing input and output code may be applied to the present invention, such as a scheme that a central data base containing files for the input and output code keeps track of and cross-references the input and output code.

In the illustrative embodiment, if one of the input code and output code is scrolled, the other code is automatically scrolled using the cross-references to the input code and output code. This enables the users to trace the input code and output code with scrolling only one of the input code and output code. In addition, if a cursor is provided in one of the input code and output code, another cursor is automatically provided in the other code. Furthermore, if a segment is selected in one of the input code and output code, a corresponding segment is automatically selected in the other code. One of ordinary skill in the art will appreciate that the code generation tool may translate input code to output code that is written in a same level programming language as the input code rather than translating the input code into output code that is written in a different programming language. One of ordinary skill in the art will also appreciate that the code generation tool may translate input code written in low level programming languages to output code written in high level programming languages and vice versa.

Figure 1:
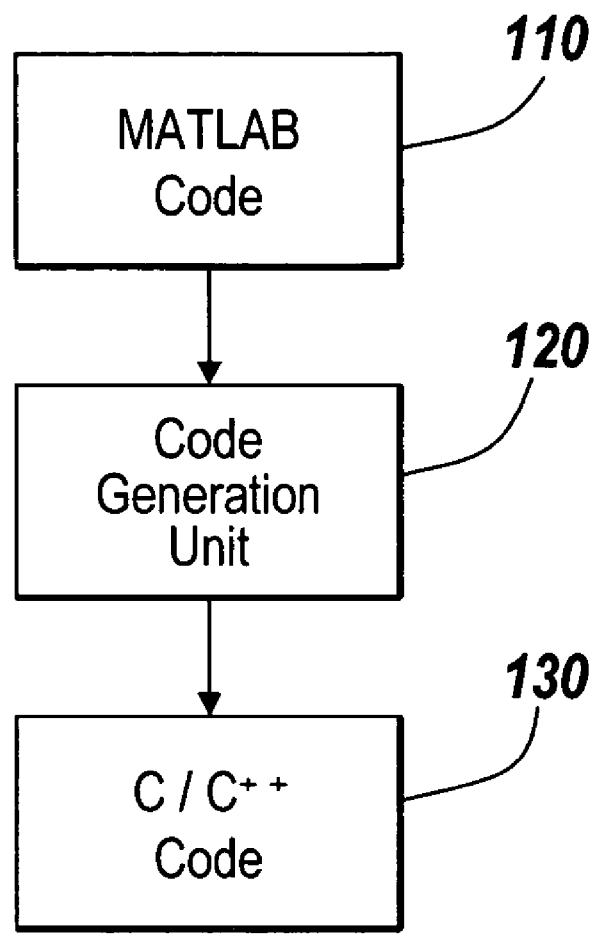
FIG. 1 is an exemplary code generation tool in the illustrative embodiment of the present invention.

FIG. 1 shows a block diagram of a high level description of an exemplary code generation tool 120 in the illustrative embodiment of the present invention. The code generation tool 120 receives input code 110 written in MATLAB® code. One of ordinary skill in the art will appreciate that MATLAB® code is an illustrative input code and the input code 110 may be written in other programming languages, including high and low level programming languages.

The code generation tool 120, in this example, translates the input code 110 written in MATLAB® code into output code 130 written in C code and/or C++ code. One of ordinary skill in the art will appreciate that C code and/or C++ code are illustrative, and the code generation tool 120 may produce output code 130 that is written in other programming languages, including high and low level programming language. The translated C code and C++ code can then be converted into a MEX file which can be called from MATLAB®. The translated code can also be compiled into a stand-alone application that can run independently of MATLAB® or can be integrated with existing C code and C++ code application as a shared library. An exemplary code generation tool 120 may include a MATLAB® compiler that automatically converts MATLAB® applications into C or C++ source code. The MATLAB® compiler eliminates the tedious manual translation process and reduces development time for applications that run outside the MATLAB® environment.

Figure 2:
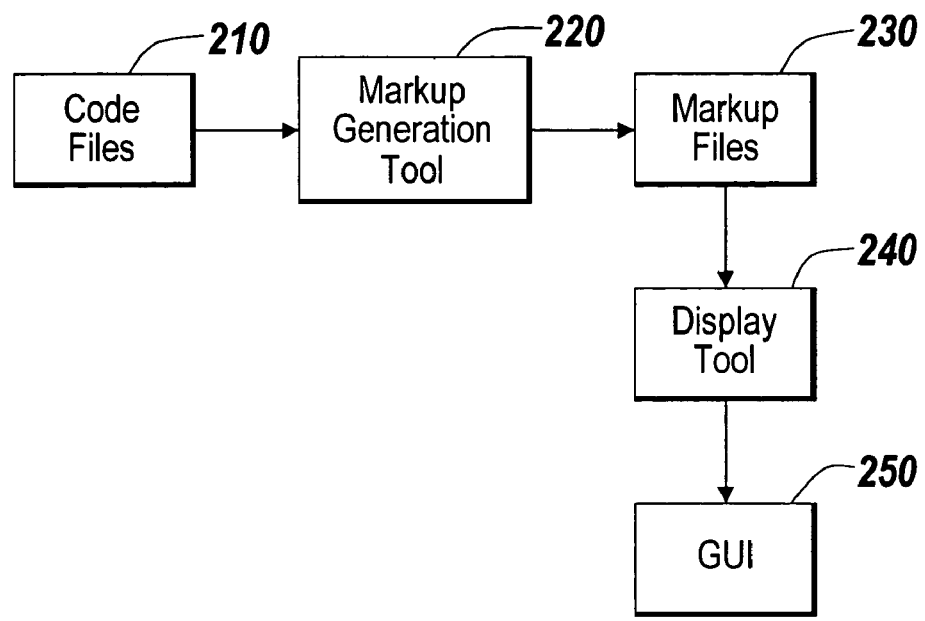
FIG. 2 is a detailed view of the code generation tool in the illustrative embodiment of the present invention depicted in FIG. 1.

FIG. 2 is a detailed view of the code generation tool 120 depicted in FIG. 1. The code generation tool 120 may include a markup generation tool 220 and a display tool 240. One of ordinary skill in the art will appreciate that the markup generation tool 220 and the display tool 240 may be implemented outside the code generation tool 120. The markup generation tool 220 receives code files 210 including input code 110 and output code 130 generated from the input code 110. The markup generation tool 220 generates markup files 230 to display the input code 110 and output code 130 together on a display. The markup files 230 may be generated using markup languages, such as Extensible Markup Language (XML). One of ordinary skill in the art will appreciate that the markup files 230 may be generated using other markup languages, such as Hypertext Markup Language (HTML) and Standard Generalized Markup Language (SGML). The markup files 230 contain cross-references to the input code 110 and corresponding output code 130. The cross-references may be made to each corresponding line of the input code 110 and output code 130. The cross-references may also be made to each corresponding element of the input code 110 and output code 130. The cross-references are described in more detail below with reference to FIGS. 4, 5 and 6A-6D. The display tool 240 receives the markup files 230 and displays the input code 110 and output code 130 together on a Graphical User Interface (GUI) 250 provided on the display. The display tool 240 displays the input code 110 and output code 130 together using the information, such as the cross-references to the input code 110 and output code 130, contained in the markup files 230. One of ordinary skill in the art will also appreciate that the display tool 240 may be invoked on the generation of output code 130 or can be invoked later.

Figure 3:
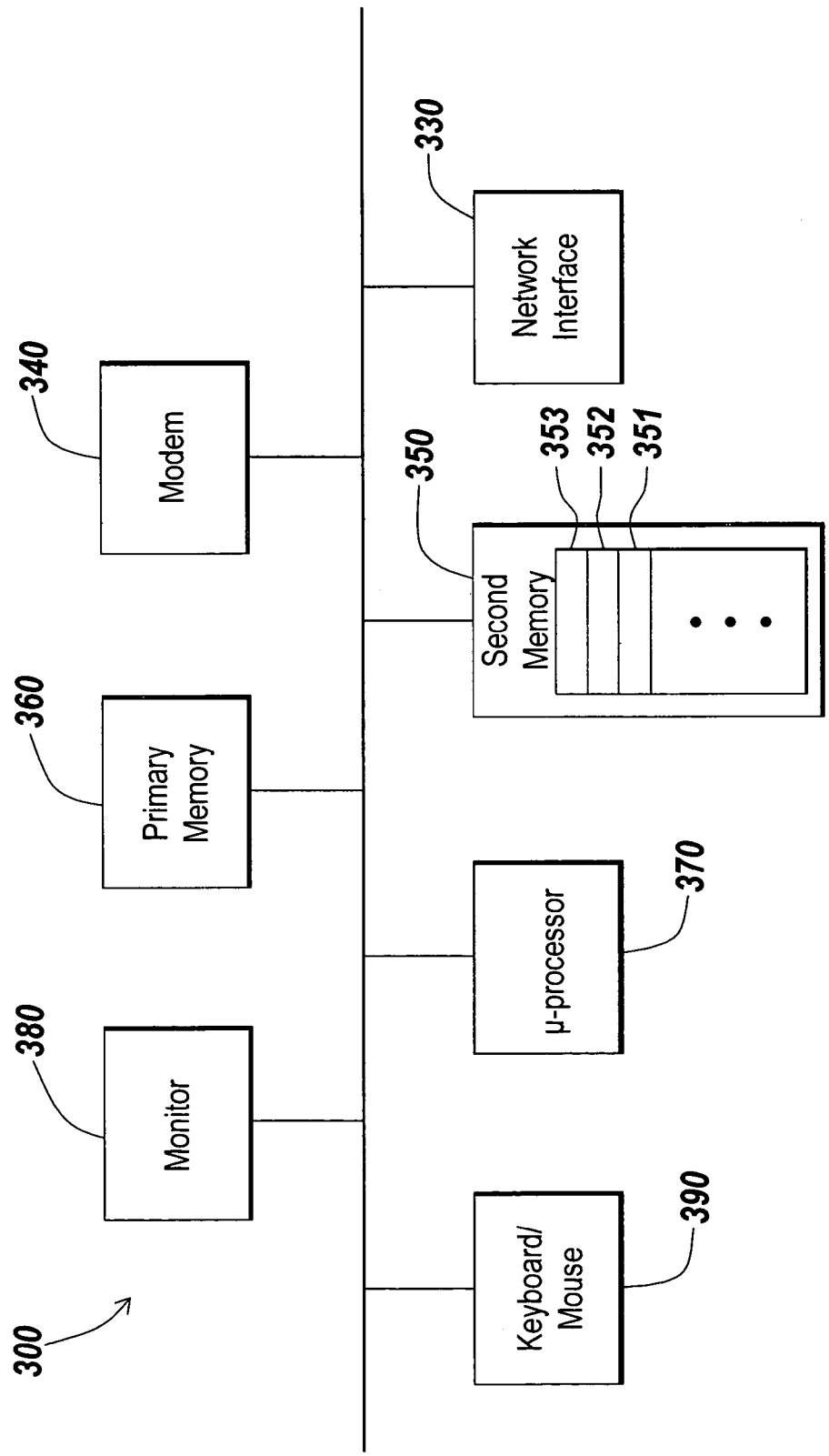
FIG. 3 is a block diagram representation of an electronic device suitable for practicing the illustrative embodiment of the present invention.

FIG. 3 is a block diagram representation of an electronic device 300 suitable for practicing the illustrative embodiment of the present invention. The electronic device 300 includes a secondary memory 350, a primary memory 360, a microprocessor 370, a monitor 380 and a keyboard/mouse 390. The microprocessor 370 controls each component of the electronic device 300 to run the software tools 120, 220 and 240 properly. The electronic device 300 displays a Graphical User Interface (GUI) 250 on the monitor 380 in which the input code 110 and corresponding output code 130 are displayed together. The primary (working) memory 360 fetches from the secondary (storage) memory 350 and provides to the microprocessor 370 the code that need to be accessed by the microprocessor 370 to operate the electronic device 300 and to run the software tools 120, 220 and 240. The secondary memory 350 usually contains software tools for applications. The secondary memory 350 includes, in particular, code 351 for the code generation tool 120, code 352 for the markup generation tool 220 and code 353 for the display tool 240. The network interface 330 and the MODEM 340 enable the electronic device 300 to communicate with other electronic devices through communication networks, such as Internet, intranet, LAN (Local Area Network), WAN (Wide Area Network) and MAN (Metropolitan Area Network). The communication facilities may support for the distributed implementations of the present invention.

Those skilled in the art will appreciate that the electronic device 300 is intended to be illustrative and not limiting of the present invention. The electronic device 300 may take any forms, including but not limited to a workstation, server, network computer, Internet appliance, mobile device, a pager, a tablet computer, and the like.

Figure 4:
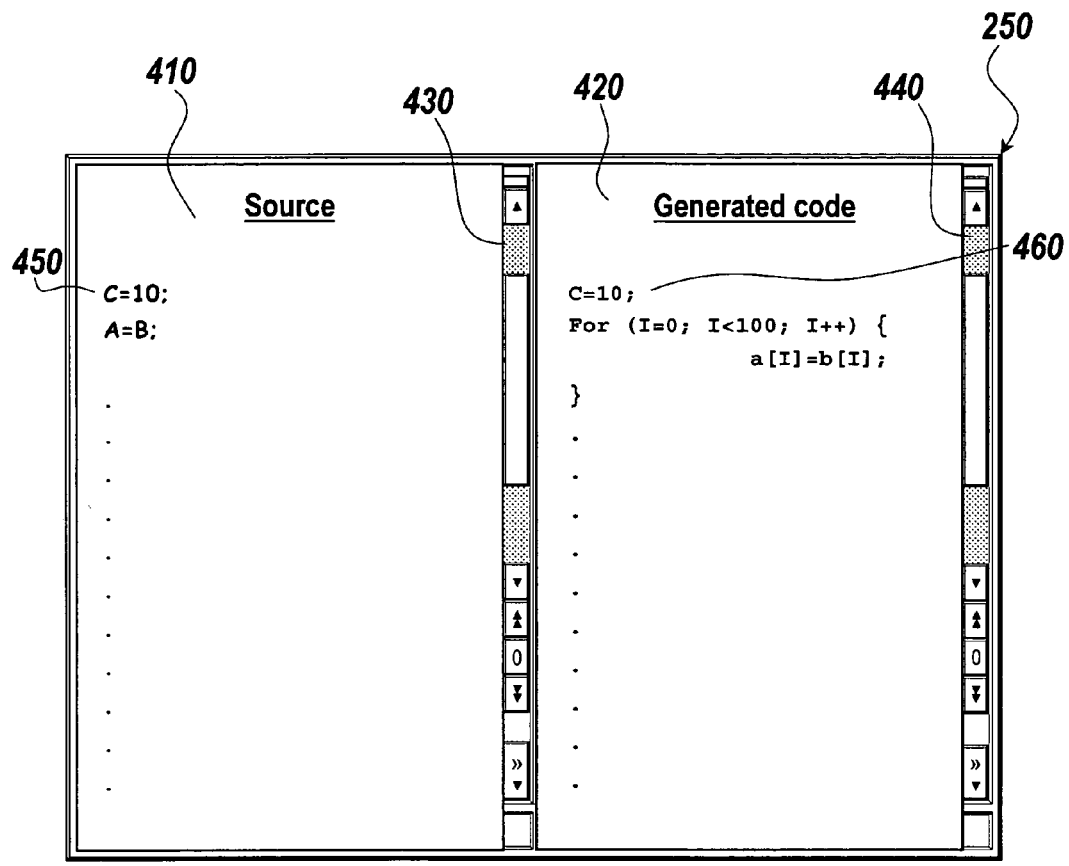
FIG. 4 is an exemplary graphical user interface (GUI) that displays input code and output code together in the illustrative embodiment of the present invention.

FIG. 4 is an exemplary graphical user interface (GUI) 250 that displays the input code 110 and output code 130 together in the illustrative embodiment of the present invention. The input code 110 and output code 130 are displayed in the GUI 250 by utilizing the markup files 230. The GUI 250 includes two panes 410 and 420 for displaying the input code 110 and output code 130, respectively. One of ordinary skill in the art will appreciate that the GUI 250 may include more than two panes depending on the number of output code 130. For example, if two different sets of output code 130 are generated, the GUI 250 may include three panes including two panes for displaying the different sets of output code 130. The input code 110 and output code 130 are displayed on the left pane 410 and right pane 420, respectively. One of ordinary skill in the art will appreciate that the input code 110 and output code 130 may be displayed on the right pane 420 and left pane 410, respectively. In particular, if two different kinds of output code 130 are displayed in the GUI 250, the input code 110 may be displayed on a center pane between side panes that display the output code 130. The input code and output code may be displayed in separate windows in some embodiments.

The GUI 250 provides scroll bars 430 and 440 on the left and right panes 410 and 420. The scroll bars 430 and 440 can be used with a mouse 390 for moving around in the input code 110 and output code 130. If users scroll input code 110 displayed on the left pane 410, output code 130 displayed on the right pane 420 is automatically scrolled to display the output code 130 that corresponds to the input code 110 being displayed on the left pane 410. If the users scroll the input code 110 using the scroll bar 430 on the left pane, the scroll bar 440 on the right pane 420 also moves automatically in proportion to the amount of the movement in the scroll bar 430. In a same manner, if the users scroll output code 130 displayed on the right pane 420, the input code 110 on the left pane 410 is also automatically scrolled to display the input code 110 that corresponds to the output code 130 being displayed on the right pane 420. The illustrative embodiment of the present invention aligns the input code 110 and output code 130 displayed on the left and right panes 410 and 420, respectively, by the first lines 450 and 460 displayed on the panes 410 and 420. One of ordinary skill in the art will appreciate that the input code 110 and output code 130 displayed on the panes 410 and 420 may be aligned by other lines, such as middle and bottom lines of the panes 410 and 420.

The illustrative embodiment of the present invention may provide cross-references to the input code 110 and corresponding output code 130 in the markup files 230. For Example, the first line 450 on the left pane 410 includes a cross-reference (213) in the markup files 230 as follows.

<ref no = "213"> C=10 <\ref>

Then, the corresponding line 460 on the right pane 420 has a same cross-reference (213) as the first line 450 on the left pane 410.

<ref no = "213"> C=10 <\ref>

If users scroll the input code 110, the display tool 240 searches the cross-references in the markup files 230 for the input code 110 and output code 130. The display tool 240 displays the output code 130 beginning with a line 460 that includes a same cross-reference as the first line 450 on the left pane 410 so that the first line 450 on the left pane 410 is aligned with a corresponding output code 130 on the right pane 420. One of ordinary skill in the art will appreciate that each element of the input code 110 may be cross-referenced to a corresponding element of the output code, which is described below with referenced to FIG. 5.

Figure 5:
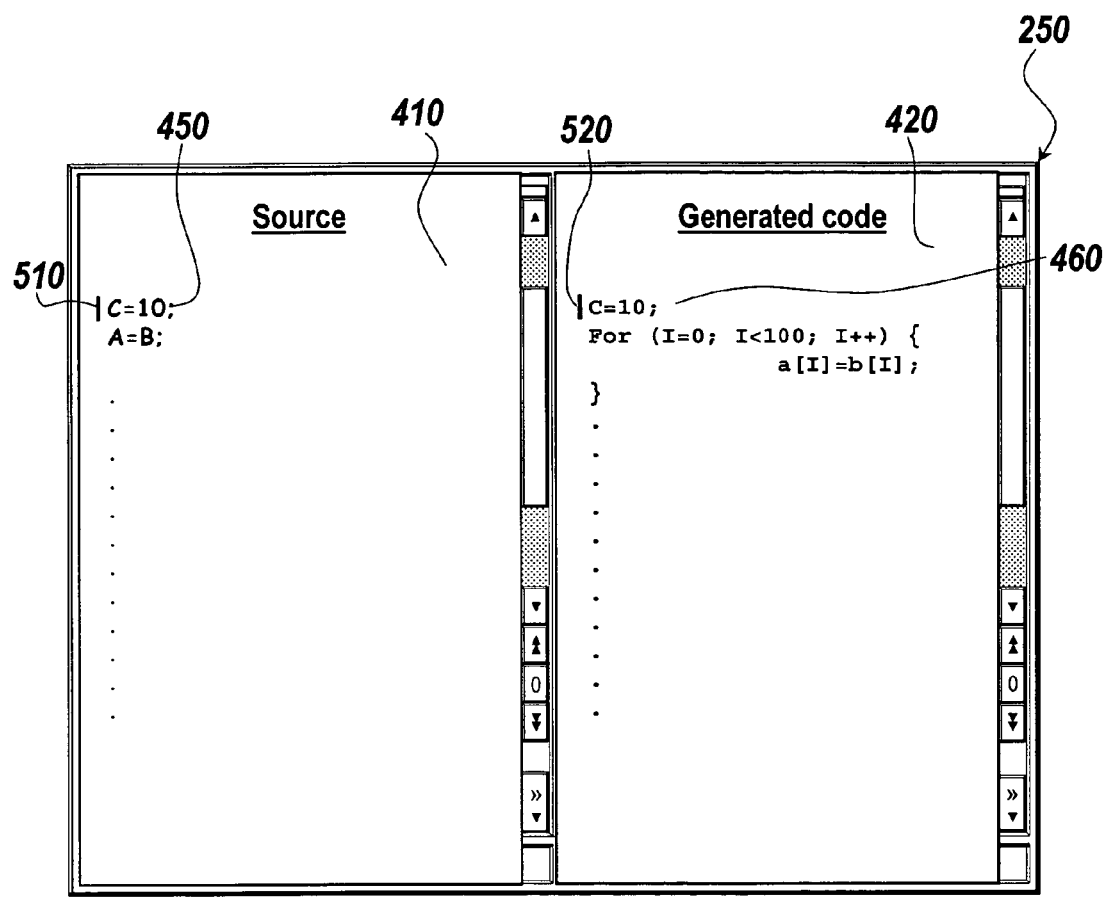
FIG. 5 is an exemplary GUI that displays cursors in the input code and output code in the illustrative embodiment of the present invention.

FIG. 5 is an exemplary GUI 250 that displays cursors 510 and 520 in the input code 110 and output code 130 displayed on the left and right panes 410 and 420, respectively, in the illustrative embodiment of the present invention. The illustrative embodiment of the present invention enables users to provide a cursor in one of the panes 410 and 420. The cursor may be provided by moving the mouse 390 to a location where the cursor is provided and clicking an index button of the mouse 390. If a cursor 510 is provided in the input code 110 displayed on the pane 410, another cursor 520 is automatically provided at a corresponding location in the output code 130 displayed on the right pane 420. In a same manner, if a cursor 520 is provided in the output code 130 displayed on the right pane 420, another cursor 510 is automatically provided at a corresponding location in the input code 110 displayed on the left pane 410.

The illustrative embodiment of the present invention uses cross-references to the input code 110 and output code 130 contained in the markup files 230 to display the cursors 510 and 520. For example, if users want to provide a cursor on the first line 450 of the input code 110 displayed on the left pane 410, the first line 450 may include cross-references as follows.

<ref no = "213"> C<\ref> <ref no = "214">= <\ref> <ref no = "215"> 10 <\ref>

Then, the corresponding output code 130 has same cross-references as follows.

<ref no = "213"> C<\ref> <ref no = "214">= <\ref> <ref no = "215"> 10 <\ref>

If a cursor 510 is provided in the input code 110 displayed on the left pane 410, the display tool 240 searches the cross-references in the markup file 230 for the input code and output code 130. The display tool 240 determines the cross-reference of the element in which the cursor 510 is provided. The display tool 240 subsequently provides another cursor 520 at the location of a corresponding element in the output code 130 that includes a same cross-reference as the element of the input code 110. The illustrative embodiment of the present invention provides a cursor 510 in the first element of input code 110 on the line 450. One of ordinary skill in the art will appreciate that the cursor may be provided at other locations, such as the middle and last element of the input code 110 on the line 450.

Figure 6A:
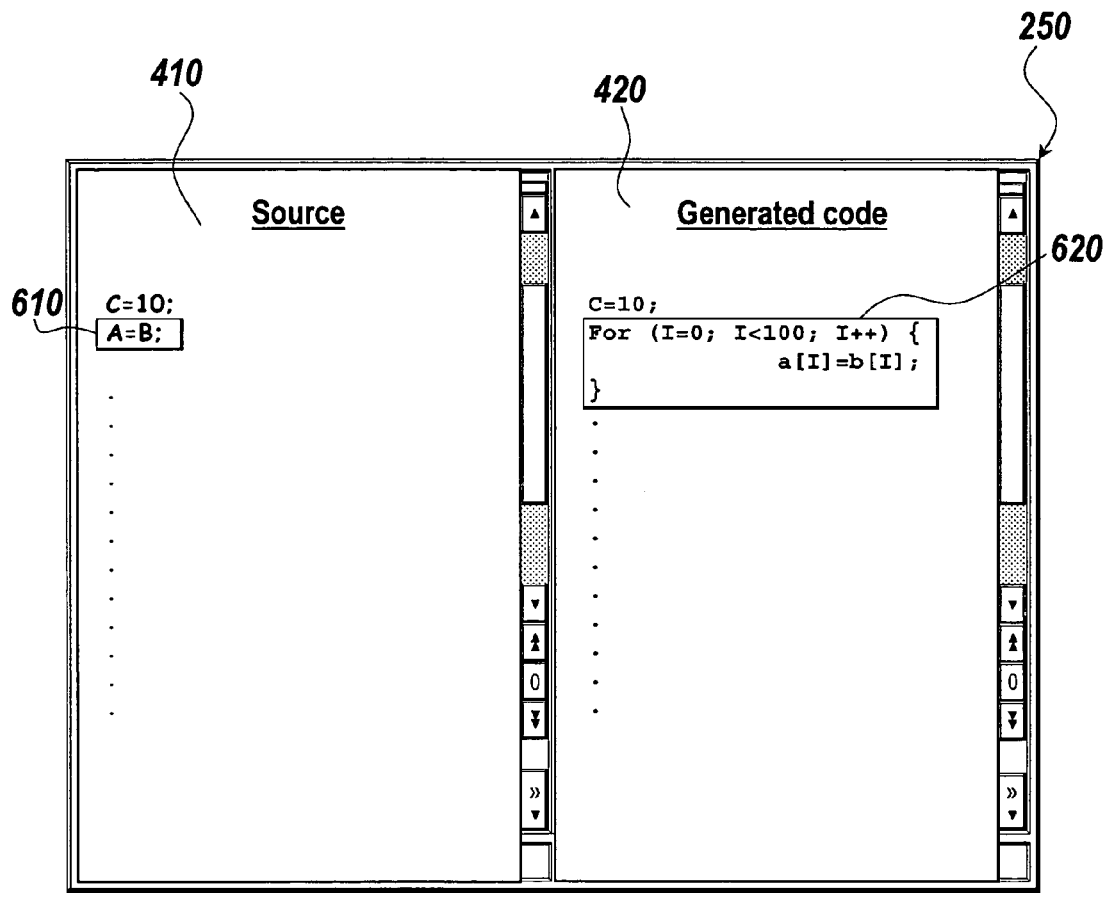
FIG. 6A is an exemplary GUI that displays segments in the input code and output code in the illustrative embodiment of the present invention.

FIG. 6A is an exemplary GUI 250 that displays segments 610 and 620 in the input code 110 and output code 130 in the illustrative embodiment of the present invention. The illustrative embodiment of the present invention enables users to select a segment in one of the input code 110 and output code 130. If a segment 610 is selected in the input code 110 displayed on the left pane 410, a corresponding segment 620 is automatically selected in the output code 130 displayed on the right pane 420. In a same manner, if a segment 620 is selected in the output code 130 displayed on the right pane 420, a corresponding segment 610 is automatically selected in the input code 110 displayed on the left pane 410. The segments 610 and 620 may be selected by moving a mouse 390 and clicking an index button of the mouse 390 on the corners of the segments. The selected segments 610 and 620 are displayed with a rectangular block. One of ordinary skill in the art will appreciate that the selected segments 610 and 620 may be highlighted so that the selected segments 610 and 620 can be easily distinguished from the rest of the input code 110 and output code 130. The selected segments 610 and/or 620 may also be edited to have a different font size, color and/or style than other code in the input and output code 110 and 130, which helps find the same segments 610 and 620 easily later.

The cross-references to input code 110 and corresponding output code 130 contained in the markup files 230 may be utilized to display the segments 610 and 620. For example, if users select a segment 610 in the input code 110 displayed on the left pane 410, the line in the segment 610 may have a markup reference as follows.

<ref no = "223"> A=B <\ref>

Then, corresponding output code in the segment 620 has a same cross-reference as the line in the segment 610.

<ref no = "223"> For (I=0; I<100; I++) { <\ref>
<ref no = "223"> a[I]=b[I] <\ref>
<ref no = "223"> } <\ref>

Thus, if a segment 610 is selected in the input code 110, the display tool 240 finds a markup reference of the input code in the segment 610 and searches output code 130 that has a same markup reference as the input code in the segment 610. The output code 130 that has a same markup reference as the input code in the segment 610 is selected and highlighted. One of ordinary skill in the art will appreciate that the cross-references may be made to the output code 130 and corresponding input code 110. For example, the output code 130 in the segment 620 may have different cross-references as follows.

<ref no = "224"> For (I=0; I<100; I++) { <\ref>
<ref no = "225"> a[I]=b[I] <\ref>
<ref no = "226"> } <\ref>

Then, the corresponding input code in the segment 610 may have a multiple markup references as follows.

<ref no = "224" "225" "226" > A=B <\ref>

One of ordinary skill in the art will appreciate that the segment 610 may include one or more elements of the input code 110, which is described below in more detail with reference to FIG. 6B. One of ordinary skill in the art will also appreciate that the segment 610 may include more than one input code line, which is described below in more detail with reference to FIG. 6C.

Figure 6B:
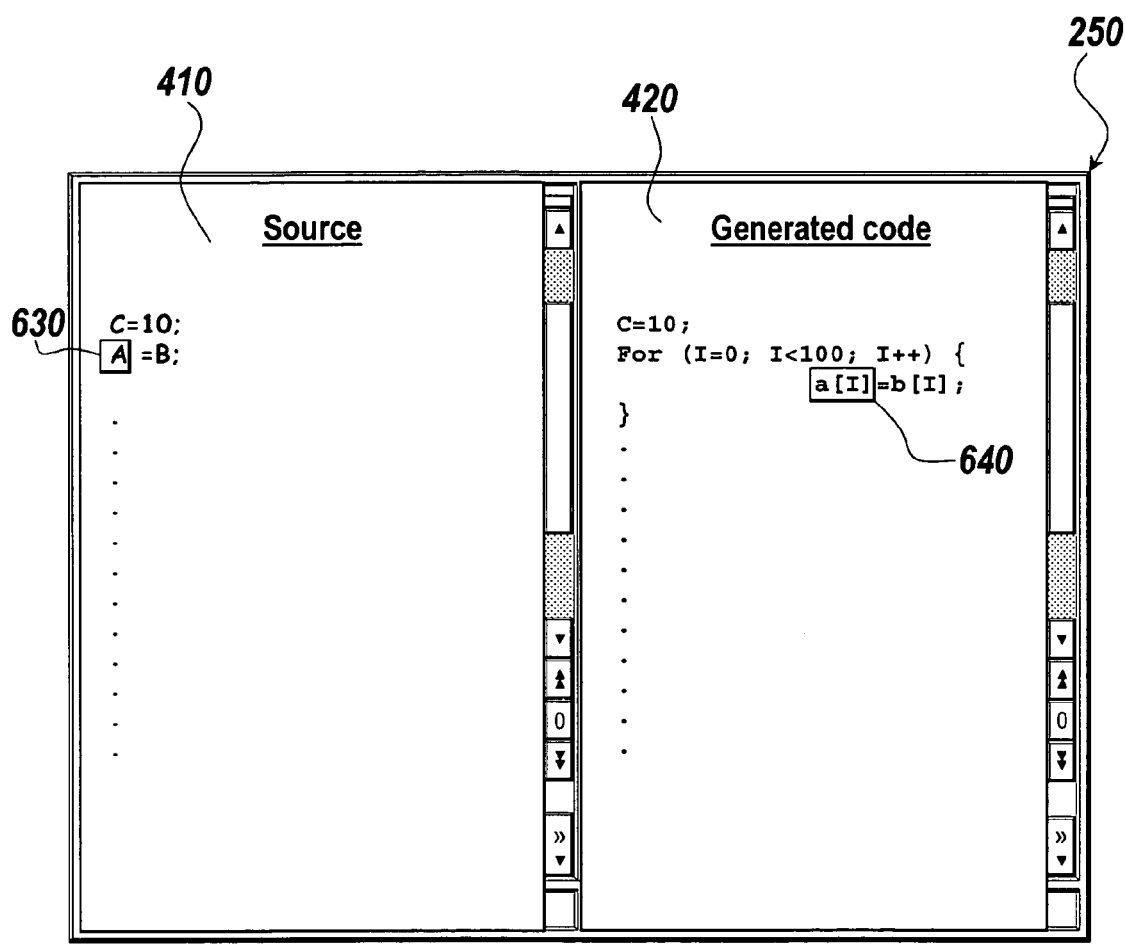
FIG. 6B is an exemplary GUI showing that the segments include elements of the input code and output code in the illustrative embodiment of the present invention.

FIG. 6B is an exemplary GUI 250 showing that the segments 630 and 640 include one or more elements of the input code 110 and output code 130 in the illustrative embodiment of the present invention. Each element of the input code 110 is cross-referenced to a corresponding element of the output code 130 as described with referenced to FIG. 5.

For example, the input code 110 including the segment 630 may have following cross-references.

<ref no = "227"> A <\ref> <ref no = "228"> = <\ref> <ref no = "229"> B <\ref>

Then, corresponding output code 130 may have same cross-reference as the input code 110.

<ref no = "227" "228" "229"> For (I=0; I<100; I++) { <\ref>
<ref no = "227"> a[I] <\ref> <ref no = "228"> = <\ref><ref no = "229"> b[I]<\ref>
<ref no = "227" "228" "229"> } <\ref>

Thus, if one or more elements are selected in the input code 110, the display tool 240 finds markup references of the input code elements in the segment 630 and searches output code elements that have same markup references as the input code elements in the segment 630. The output code elements that have same markup references as the input code elements are selected and highlighted in the segment 640. One of ordinary skill in the art will appreciate that the output code 130 that has multiple cross-references including a same markup reference as the input code 110 in the segment 630 may or may not be included in the segment 640 depending on a design choice. One of ordinary skill in the art will also appreciate that the cross-references may be made to the output code 130 and corresponding input code 110, as described with reference to FIG. 6A.

By using the multiple cross-references described above, the display depicted in FIG. 6B may be automatically changed to the display depicted in FIG. 6A. If an element 630 that has a cross-reference "227" is selected in the input code 110, the cross-reference "227" is searched in the output code 130. If multiple cross-references "227" "228" "229" that include the searched cross-reference "227" are found in the output code 130, elements that include the other cross-references "228" and "229" are additionally selected in the input code 110. Subsequently, elements that include the cross-references "228" and "229" are selected in the output code 130, which results in the display depicted in FIG. 6A.

Figure 6C:
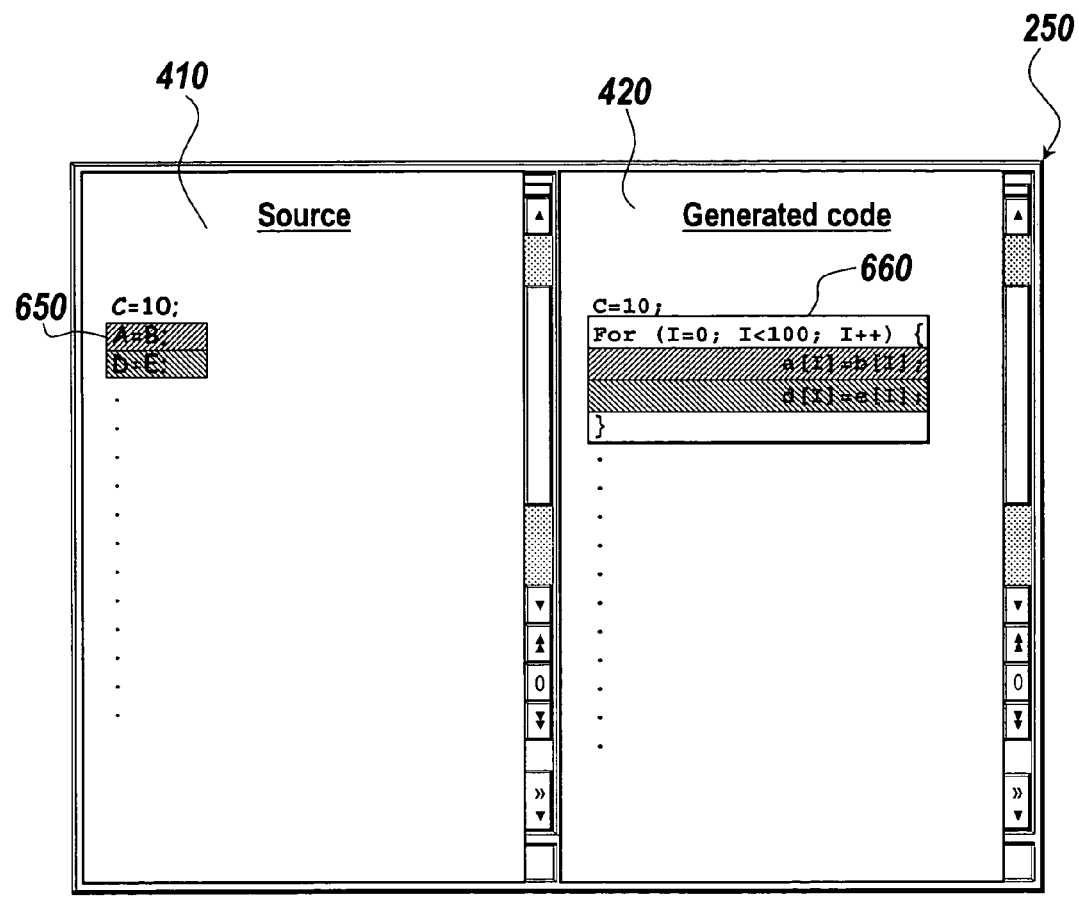
FIG. 6C is an exemplary GUI showing that the segments include a plurality of lines in the input code and output code in the illustrative embodiment of the present invention.

FIG. 6C is an exemplary GUI 250 showing that the segment 650 includes a plurality of input code lines in the illustrative embodiment of the present invention. If users select a plurality of lines in the segment 650, a corresponding segment 660 in the output code 130 is automatically selected. Each of the input code 110 and corresponding output code 130 in the segments 650 and 660 may be displayed with different colors so that users can easily distinguish between the lines. Each of the input code 110 in the segment 650 may have following cross-references.

<ref no = "221" > A=B <\ref>
<ref no = "231" > D=E <\ref>

Then, corresponding output code 130 may have following cross-references.

<ref no = "221" "231"> For (I=0; I<100; I++) { <\ref>
<ref no = "221"> a[I] = b[I] <\ref>
<ref no = "231"> d[I] =e[I] <\ref>
<ref no = "221" "231"> } <\ref>

Thus, if multiple input code lines are included in the segment 650, the display tool 240 finds markup references of the input code lines in the segment 650 and searches output code 130 that has the same markup references as the input code lines in the segment 650. The output code 130 that includes a same markup reference as an input code line in the segment 650 is selected and displayed with a same color as the input code 110. One of ordinary skill in the art will appreciate that the output code 130 that has multiple cross-references including same markup references as the input code lines in the segment 650 may or may not be included in the segment 660 depending on a design choice. One of ordinary skill in the art will also appreciate that the cross-references may be made to the output code 130 and corresponding input code 110, as described with reference to FIG. 6A.

Figure 6D:
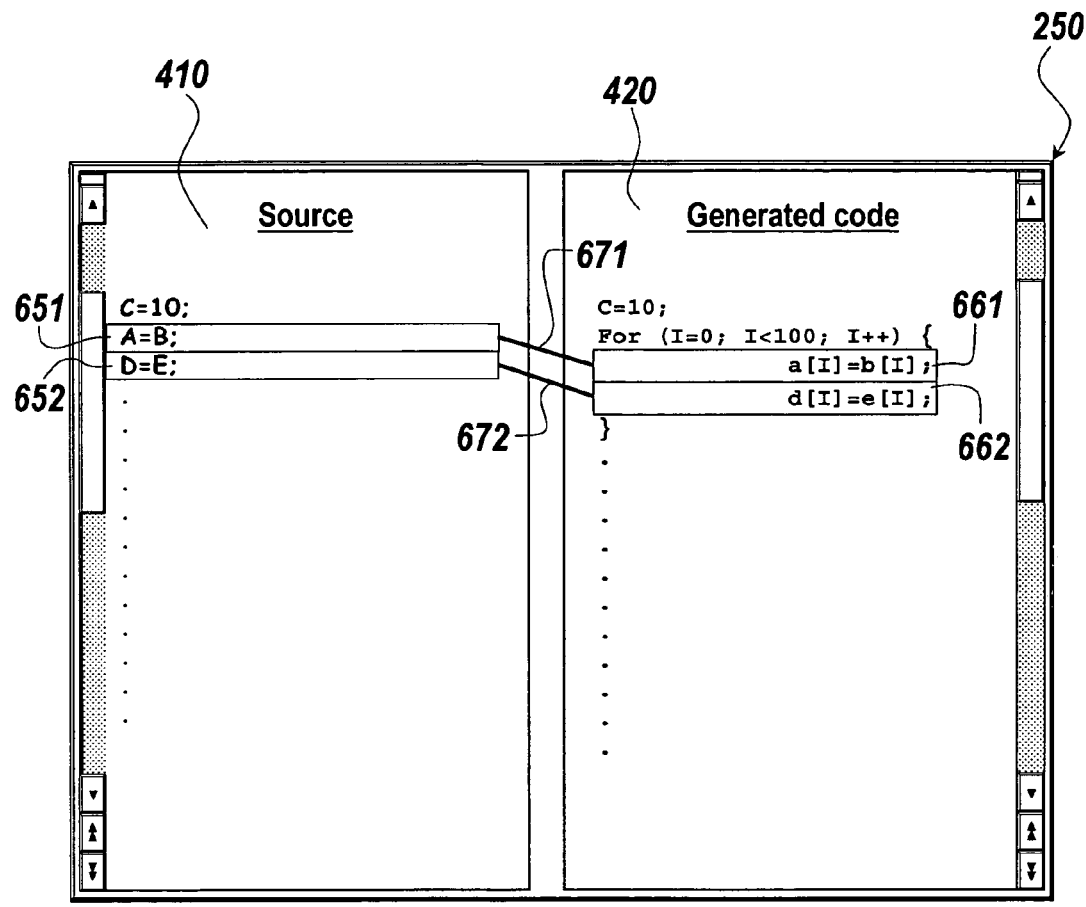
FIG. 6D is another exemplary GUI showing that a plurality of lines are selected in the input code displayed on the left pane.

FIG. 6D is another exemplary GUI 250 showing that a plurality of lines 651 and 652 are selected in the input code 110 displayed on the left pane 410. If users select a plurality of lines on the input code 110 or output code 130, corresponding lines are automatically selected in the output code 130 or input code 110. In this example, when the users select lines 651 and 652 on the left pane 410, corresponding lines 661 and 662 are selected on the right pane 420. Instead of displaying corresponding lines in the input and output code with a same color as depicted in FIG. 6C, the lines 651 and 652 in the input code 110 and corresponding lines 661 and 662 in the output code are coupled through connection lines 671 and 672 to indicate that the coupled input and output code lines are corresponding to each other. One of ordinary skill in the art will appreciate that coupling of lines in the input code and corresponding lines in the output code 130 through the connection lines may be applied to the embodiment depicted in FIG. 6A in which the users select a single line in the input code 110. One of ordinary skill in the art will also appreciate that the connection lines may include any other indicators that can imply that the corresponding input and output lines are related to each other, such as dotted lines.

Figure 6E:
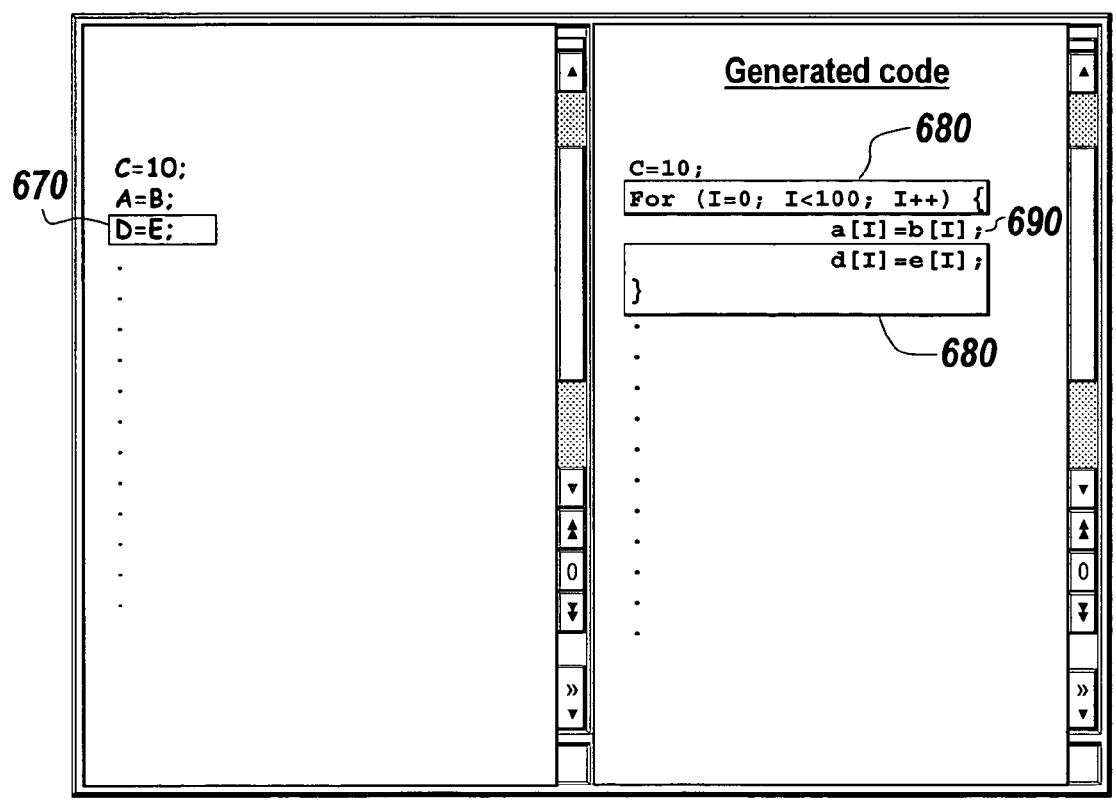
FIG. 6E is another exemplary GUI that displays segments in the input code and output code in the illustrative embodiment of the present invention.

FIG. 6E is another exemplary GUI 250 that displays segments 670 and 680 in the input code 110 and output code 130 in the illustrative embodiment of the present invention. The segment 670 includes one of the input code lines in the segment 650 depicted in FIG. 6C. The segment 680 includes output code 130 that includes a same cross-reference as the input code 110 in the segment 670. The segment 680 includes output code 130 that has multiple references including a same markup reference as the input code 110 in the segment 650. The output code 130 that has multiple references is shared by another output code 130 on the line 690. One of ordinary skill in the art will appreciate that the shared output code 130 may or may not be included in the segment 680 depending on a design choice.

In summary, the illustrative embodiment of the present invention provides a code generation tool 120 that receives input code 110 and produces corresponding output code 130. The illustrative embodiment of the present invention generates markup files 230 to display the input code 110 and output code 130 together on a display. The markup files 230 may contain cross-references to the input code 110 and corresponding output code 130. The illustrative embodiment of the present invention provides a graphical user interface that displays the input code 110 and output code 130 together using the cross-references to the input code 110 and output code 130 contained in the markup files 230. If one of the input code 110 and output code 130 displayed on the graphical user interface is scrolled, the other code is automatically scrolled using the cross-references. This enables users to trace the input code 110 and output code 130 with scrolling only one of the input code 110 and output code 130. In addition, if a cursor is provided in one of the input code 110 and output code 130, another cursor is automatically provided in the other code. If a segment is selected in one of the input code 110 and output code 130, a corresponding segment is automatically selected in the other code using the cross-references to the input code 110 and output code 130. Thus, the illustrative embodiment of the present invention enables users to trace the output code 130 generated from corresponding input code 110, and to trace input code 110 from which corresponding output code 130 is generated.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any code generation tool that receives input code and produces output code. Practitioners of the art will realize that the sequence of steps and architectures depicted in the figures may be altered without departing from the scope of the present invention and that the illustrations contained herein are singular examples of a multitude of possible depictions of the present invention.

I claim:

1. In an electronic device, a method comprising:
    receiving a textual input description, the input description including text to be displayed and a first set of textual cross-references associated with segments of the text to be displayed, each textual cross-reference including one or more textual identifiers for the associated segment of the text to be displayed;
    receiving a textual output description, the output description including text to be displayed and a second set of textual cross-references associated with segments of the text to be displayed, each textual cross-reference including one or more textual identifiers for the associated segment of the text to be displayed;
    identifying a first cross-reference in the first set of cross-references associated with a segment of the text to be displayed in the input description using the electronic device;
    searching the second set of cross-references in the output description to identify a second cross-reference that matches the first cross-reference using the electronic device, the second cross-reference matching the first cross-reference when at least one identifier in the second cross-reference matches at least one identifier in the first cross-reference, the second cross-reference being associated with a segment of the text to be displayed in the output description that corresponds to the segment of the text to be displayed in the input description; and
    displaying the segment of the text to be displayed in the input description and the segment of the text to be displayed in the output description together on a display.

2. The method of claim 1 wherein the input description and the output description include code descriptions expressed in programming languages.

3. The method of claim 1 wherein the input description and the output description are expressed in different programming languages.

4. The method of claim 1 wherein the input description and the output description are displayed in separate panes of a same window.

5. The method of claim 1 wherein the input description and the output description are displayed in separate windows.

6. The method of claim 1 further comprising
    providing a first scrolling tool for scrolling the input description; and
    providing a second scrolling tool for scrolling the output description.

7. The method of claim 6 wherein the first and second scrolling tools include scrolling bars.

8. The method of claim 7 wherein in response to controlling one of the first scrolling bar or the second scrolling bar, the other scrolling bar is automatically controlled in proportion to a controlled amount in said one of the first scrolling bar and the second scrolling bar.

9. The method of claim 6 further comprising, in response to scrolling one of the input description or the output description, displaying corresponding input description and output description adjacent to the scrolled description on the display.

10. The method of claim 1, wherein the first cross-reference and the second cross-reference are coded in the Extensible Markup Language (XML) programming language.

11. The method of claim 1, wherein the first cross-reference is in the input description.

12. In an electronic device, a method comprising:
    displaying a first textual description and a second textual description together on a display, the first description including displayed text elements and a first set of non-displayed textual cross-references associated with the displayed text elements, the second description including displayed text elements and a second set of non-displayed textual cross-references associated with the displayed text elements, each textual cross-reference including one or more textual identifiers for the associated displayed text element;
    displaying a first cursor in a first displayed text element in the first description;
    identifying a first cross-reference in the first set of cross-references associated with the first displayed text element;
    searching the second set of cross-references in the second description to identify a second cross-reference that matches the first cross-reference, the second cross-reference matching the first cross-reference when at least one identifier in the second cross-reference matches at least one identifier in the first cross-reference, the second cross-reference being associated with a second displayed text element in the second description that corresponds to the first displayed text element; and
    displaying a second cursor in the second displayed text element.

13. The method of claim 12 wherein the first cursor and the second cursor are presented in a start position of the input description and the output description.

14. The method of claim 12 wherein the first cursor and the second cursor are presented on a same line on the display.

15. The method of claim 12 wherein the first and second cursors are presented in a middle of the input description and the output description.

16. The method of claim 12 wherein the cross-references include reference numbers to the input description and the output description.

17. The method of claim 12 wherein the cross-references are attached to the input description and the output description using the XML (Extensible Markup Language) programming language.

18. The method of claim 12, wherein the first description is generated from the second description.

19. The method of claim 12, wherein the second description is generated from the first description.

20. A system for displaying input code and output code corresponding to the input code, the system comprising:
   a textual input description including textual input code and a first set of textual cross-references associated with segments of the textual input code, each textual cross-reference including one or more textual identifiers for the associated segment of the textual input code, the textual input code being code written in a programming language for a technical computing environment;
   a textual output description including textual output code and a second set of textual cross-references associated with segments of the textual output code, each textual cross-reference including one or more textual identifiers for the associated segment of the textual output code, the textual output code being code generated from the textual input code into code for a programming language that is independent of technical computing environments;
   a processor configured to:
      identify a first cross-reference in the first set of cross-references associated with a segment of the input code, and
      search the second set of cross-references to identify a second cross-reference that matches the first cross-reference, the second cross-reference matching the first cross-reference when at least one identifier in the second cross-reference matches at least one identifier in the first cross-reference, the second cross-reference being associated with a segment of the output code that corresponds to the segment of the input code; and
   a display for showing the segment of the input code and the segment of the output code together.

21. The system of claim 20 wherein the processor is further configured to:
   generate an input code markup file and an output code markup file, the input code markup file containing the first cross-reference associated with the input code and the output code markup file containing the second cross-reference associated with the output code.

22. The system of claim 20 wherein the cross-references include line references to a line of the input code and a corresponding line of the output code.

23. The system of claim 20 wherein the cross-references include line references to a line of the output code and a corresponding line of the input code.

24. The system of claim 20 wherein the cross-references include references to an element of the input code and a corresponding output code element.

25. The system of claim 20 wherein the cross-references include references to an element of the output code and a corresponding input code element.

26. The system of claim 20 wherein the processor is further configured to:
   provide a graphical user interface element in which the input code and the output code are displayed together.

27. The system of claim 20 wherein the processor is further configured to:
   display the input code and the output code in separate windows.

28. The system of claim 20 wherein the input code and the output code are described in a textual format.

29. A computer-readable storage medium comprising computer-executable instructions executable in a computer system, the instructions including one or more instructions for:
   receiving a textual input description, the input description including text to be displayed and a first set of textual cross-references associated with segments of the text to be displayed, each textual cross-reference including one or more textual identifiers for the associated segment of the text to be displayed;
   receiving a textual output description, the output description including text to be displayed and a second set of textual cross-references associated with segments of the text to be displayed, each textual cross-reference including one or more textual identifiers for the associated segment of the text to be displayed;
   identifying a first cross-reference in the first set of cross-references associated with a segment of the text to be displayed in the input description;
   searching the second set of cross-references in the output description to identify a second cross-reference that matches the first cross-reference, the second cross-reference matching the first cross-reference when at least one identifier in the second cross-reference matches at least one identifier in the first cross-reference, the second cross-reference being associated with a segment of the text to be displayed in the output description that corresponds to the segment of the text to be displayed in the input description; and
   displaying the segment of the text to be displayed in the input description on one side of a display and the segment of the text to be displayed in the output description on the other side of the display.

30. The medium of claim 29 further comprising one or more instructions for:
   providing a first scrolling bar for scrolling the input description; and
   providing a second scrolling bar for scrolling the output description.

31. The medium of claim 30 wherein in response to controlling one of the first scrolling bar or the second scrolling bar, the other scrolling bar is automatically controlled in proportion to a controlled amount in said one of the first scrolling bar and the second scrolling bar.

32. The medium of claim 29, wherein the first cross-reference and the second cross-reference are coded in the Extensible Markup Language (XML) programming language.

33. A computer-readable storage medium comprising computer-executable instructions executable in a computer system, the instructions including one or more instructions for:
   displaying a textual input description and a textual output description together on a display, the input description including displayed text elements and a first set of non-displayed textual cross-references associated with the displayed text elements, the output description including displayed text elements and a second set of non-displayed textual cross-references associated with the displayed text elements, each textual cross-reference including one or more textual identifiers for the associated displayed text element;

displaying a first cursor in a first displayed text element in the input description;

identifying a first cross-reference in the first set of cross-references associated with the first displayed text element where the first cursor is displayed;

searching the second set of cross-references in the output description to identify a second cross-reference that matches the first cross-reference, the second cross-reference matching the first cross-reference when at least one identifier in the second cross-reference matches at least one identifier in the first cross-reference, the second cross-reference being associated with a second displayed text element in the output description that corresponds to the first displayed text element;

displaying a second cursor automatically in the second displayed text element in the output description; and displaying the first displayed text element in the input description on one side of a display and the second displayed text element in the output description on the other side of the display.

34. The medium of claim 33 wherein the input description and the output description which the first cursor and the second cursor are presented to, respectively, make cross-references to each other.

35. The medium of claim 34 wherein the cross-references include reference numbers to the input description and the output description.

\* \* \* \* \*

UNITED STATES PATENT AND TRADEMARK OFFICE
CERTIFICATE OF CORRECTION

| | | |
|---|---|---|
| PATENT NO. | : 7,543,270 B1 | Page 1 of 1 |
| APPLICATION NO. | : 10/763487 | |
| DATED | : June 2, 2009 | |
| INVENTOR(S) | : Andrew Grace | |

It is certified that error appears in the above-identified patent and that said Letters Patent is hereby corrected as shown below:

On the Title Page at Item (73) Assignee, replace "The Math Works, Inc." with --The MathWorks, Inc.--.

Signed and Sealed this
Eighteenth Day of November, 2014

Michelle K. Lee
*Deputy Director of the United States Patent and Trademark Office*